Nov. 19, 1929.  W. B. STONE  1,736,101

STORAGE BATTERY SEPARATOR AND RETAINER

Filed Sept. 16, 1926

Inventor
Walter B. Stone
By Attorney
Augustus B. Stoughton

Patented Nov. 19, 1929

1,736,101

UNITED STATES PATENT OFFICE

WALTER B. STONE, OF WEBSTER, MASSACHUSETTS

STORAGE-BATTERY SEPARATOR AND RETAINER

Application filed September 16, 1926. Serial No. 135,761.

The principal object of the present invention is to increase the area of the slots of a lattice type or slotted separator without diminishing its mechanical strength and at the same time to retain the active material of a plate while providing sufficient porosity for the passage of the current.

Another object of the invention is to enhance the ability of a slotted separator to retain and prevent the passage through it of particles of active material. Other objects of the invention will appear from the following description at the end of which the invention will be claimed.

In the following description reference will be made to the accompanying drawing forming part hereof and in which Figure 1 is a perspective view of a portion of an element equipped with separators embodying features of the invention.

Figure 1:
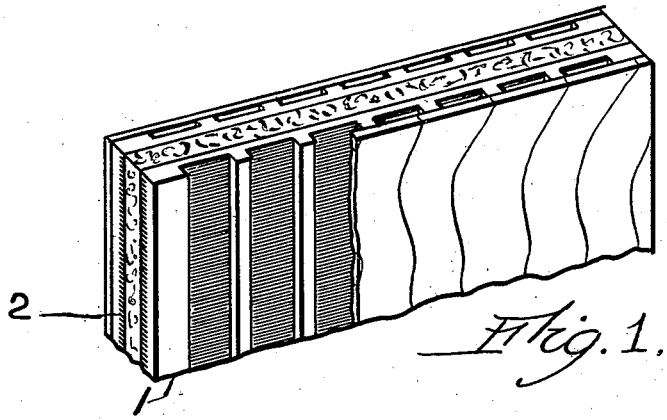
Figure 2:
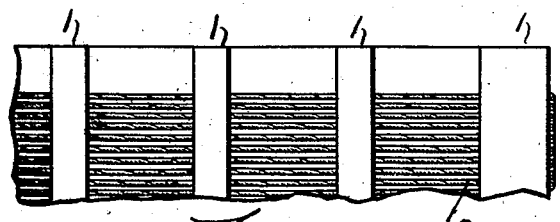
Fig. 2 is an elevational view of a part of a retainer and separator embodying features of the invention.
Figure 3:
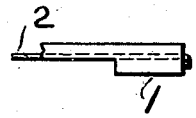
Fig. 3 is a top or plan view of a portion of the same.

Referring to the drawing, and more particularly to Figs. 2 and 3, the separator and retainer is ribbed on one face as at 1; and it has slots ranging crosswise of the ribs and clear across the other face and extending into the ribs and through the portions between them. 2 is porous inert material or material adapted to become inert, and it fills the slots. The slots expose a comparatively large area of the face of the plate or electrode 3 to the electrolyte while at the same time the porous material 2 serves to oppose detachment of particles of material from the surface of the plate without substantially interfering with the area of the surface of the plate to which the electrolyte has access.

Figure 5:
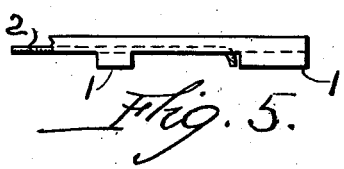
Figs. 4 and 5 are views similar to Figs. 2 and 3 and illustrating a modification of the invention.
Figure 4:
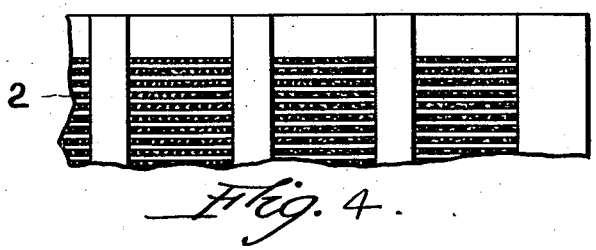

The separator and retainer may well be made of wood, rubber or other like material and the porous inert material may well be fibrous or in the form of filaments, threads or strands or even granular. The object is to secure porosity in the filling material which assists in retaining the active material of the plates. It is possible in the filling to mix acid proof with nonacid proof substances in order to vary the ultimate porosity. In a retainer of the type described provided with filling material the slots may be considerably wider than would be advisable in the absence of filling material. In the case of wooden separators the filling tends to strengthen the structure. As shown in Figs. 2 and 3 the filling material is in the form of threads or strands which can be readily fed from spools and rolled into place and they are shown to extend from edge to edge of the retainer. In Figs. 4 and 5 the filling material does not extend from edge to edge of the separator. In the case of granular material or filling, it may be applied in the form of a paste or cement.

I claim:

1. A storage battery separator and retainer comprising a one-piece body ribbed on one face and having slots ranging crosswise of the ribs and clear across the other face and extending into the ribs and through the portions between them, and porous material filling the slots.

2. A storage battery separator and retainer comprising a one-piece body ribbed on one face and having slots ranging crosswise of the ribs and clear across the other face and extending into the ribs and through the portions between them, and fibrous material filling the slots.

3. A storage battery separator and retainer comprising a one-piece body ribbed on one face and having slots ranging crosswise of the ribs and clear across the other face and extending into the ribs and through the portions between them, and fibrous strands filling the slots.

WALTER B. STONE.